UNITED STATES PATENT OFFICE.

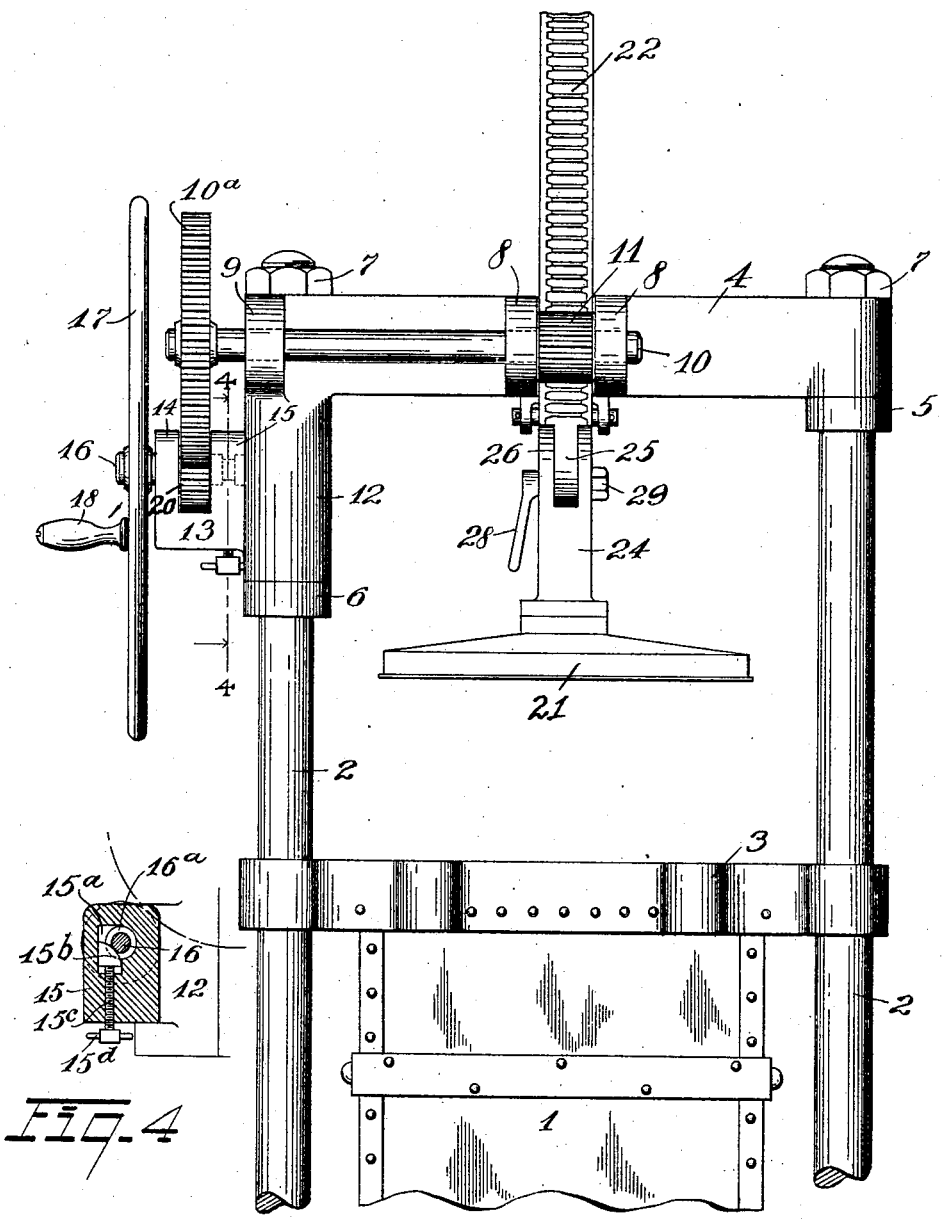

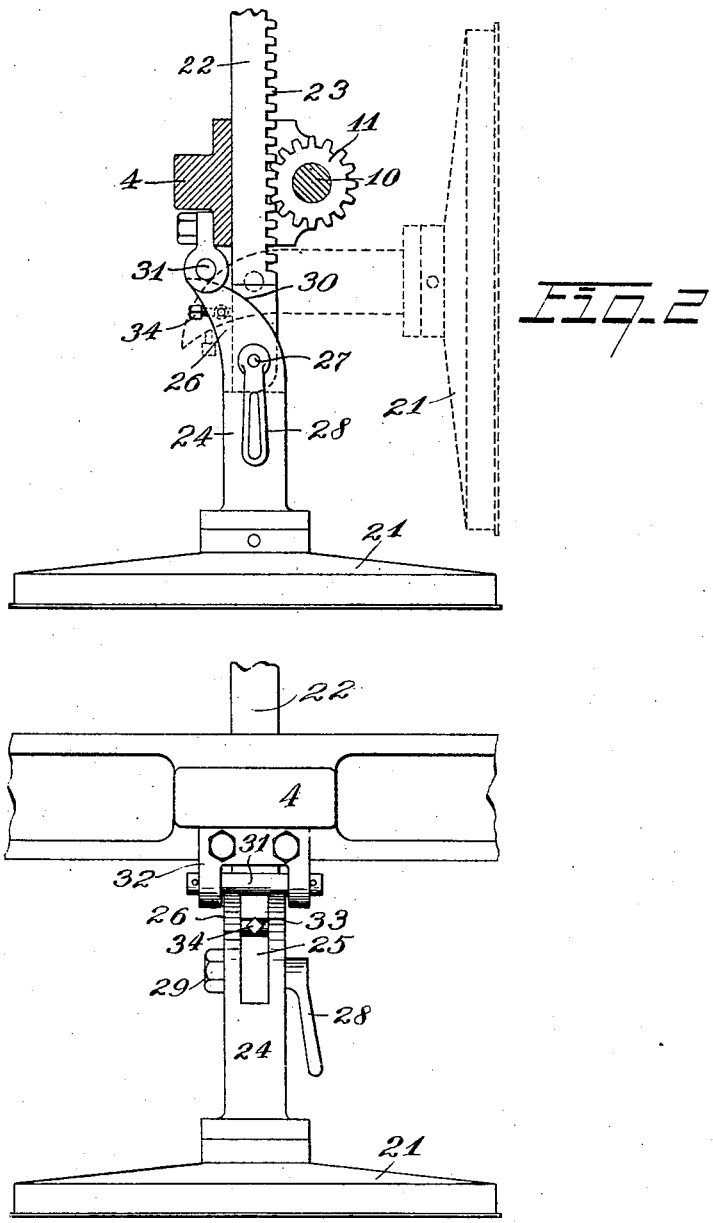

HENRY G. MILLER, OF CLEVELAND, OHIO, ASSIGNOR TO THE IDEAL FILTER COMPANY, OF CLEVELAND, OHIO, A CORPORATION OF OHIO.

PRESS.

939,732.   Specification of Letters Patent.   Patented Nov. 9, 1909.

Application filed January 8, 1909. Serial No. 471,318.

*To all whom it may concern:*

Be it known that I, HENRY G. MILLER, a citizen of the United States, residing at Cleveland, in the county of Cuyahoga and State of Ohio, have invented a certain new and useful Improvement in Presses, of which the following is a full, clear, and exact description, reference being had to the accompanying drawings.

This invention relates to filters designed and used chiefly for the purpose of clarifying liquids, such as beer, which contains gas in solution.

The object of the invention is to provide new and useful means whereby the piston or follower which is employed for the purpose of packing the filter mass in filters may be automatically moved out of the way when elevated a certain distance above such mass and above the casing or drum within which the mass is packed.

A further object of the invention is the provision of improved means for preventing the rotation of the shaft which operates the press.

Generally speaking, the invention may be defined as consisting of the combinations of elements embodied in the claims hereto annexed and illustrated, in one exemplification, in the drawings forming a part hereof, wherein—

Figure 1 represents an elevation of the upper part of a filter, showing my invention applied thereto; Fig. 2 is a sectional detail representing the cross-frame, the shaft for raising and lowering the follower, and the construction of the support by means of which the piston or follower is raised and lowered; Fig. 3 represents a detail in elevation of the parts shown in the preceding figure; and Fig. 4 represents a sectional detail of the stub shaft which carries the hand wheel and pinion by means of which the follower shaft is operated.

Describing the parts by reference characters, 1 represents the casing of a filter or press, the same being made of any suitable metal and being of any suitable shape in cross section.

2 denotes a pair of uprights, which may be supported from any suitable part of the filter and project upwardly through apertures provided in a flange 3 at the top of the filter casing. The upper ends of the uprights support a cross frame 4, said cross frame being supported by collars 5 and 6 on said uprights and being held in place by means of nuts 7 on the upper ends of the uprights. The cross frame is provided, at the central portion thereof, with a pair of lugs 8 and at one side with a lug 9, said lugs forming journals for the shaft 10. Shaft 10 is provided, between the lugs 8, with a pinion 11, which pinion is adapted to mesh with the rack bar by means of which the follower is raised and lowered. The end of the cross frame 4 which is provided with the lug 9 is extended downwardly to form a sleeve 12, said sleeve resting on the collar 6. The sleeve 12 is provided with a lateral projection 13, preferably integral therewith, having a pair of upwardly projecting lugs 14 and 15, said lugs forming bearings for the stub shaft 16, on which shaft there is mounted a hand wheel 17 provided with an operating handle 18. One of the lugs, as 15, is provided with a recess $15^a$ forming a chamber merging with the bearing for the stub-shaft 16, said chamber having slidably mounted therein a plunger $15^b$ provided with a beveled or cam face adapted to engage a reduced portion $16^a$ of said shaft. The plunger $15^b$ is operated by means of a bolt $15^c$ threaded into the lug 15 and provided with operating handles $15^d$. By operating the bolt, the stub shaft may be clamped against rotation by the weight of the follower or by the swelling of the filter mass beneath the follower. Between the lugs 14 and 15, shaft 16 is provided with a pinion 20 meshing with a gear $10^a$ on the shaft 10.

21 denotes the follower, whereby the filter mass which is inserted within the casing 1 may be subjected to pressure for the purpose of packing and of squeezing out the superfluous water in the operation of packing the filter. This follower is suspended from the rack bar and, in order to permit of the convenient and automatic removal of the follower from the way of the workmen to permit access to the interior of the filter casing, as when the filter mass is being inserted or the filter is being cleansed, the following construction is provided. The follower support comprises an upper and a lower part pivotally connected, the upper part being provided with a rack engaged by the pinion 11 and the lower part, which is pivoted to the upper part, being connected to the follower and being provided at its upper end with rounded or cam-shaped projections adapted to engage a roller carried by the cross-frame, to tilt the follower to the position shown in dotted lines in Fig. 2 by the operation of raising said follower. 22 denotes the upper portion of the follower support, such upper portion being provided with rack teeth 23 meshing with the teeth of the pinion 11, the rack bar thus formed reciprocating through a suitable recess or aperture provided in the cross-frame 4. The lower portion 24 of the follower-support is shown as connected directly to such follower and as having its upper part recessed or yoked for the reception of the lug or tenon 25 carried by the lower end of the rack bar. This tenon projects into a recess provided between the upwardly projecting lugs 26 on the upper end of the lower portion 24 and is pivotally connected to said lugs by means of a bolt 27 extending through said lugs and the lug or tenon on the end of the rack bar and having a handle 28 forming an extension of the head of said bolt, and a nut 29. As will appear more particularly from Fig. 2, the upper ends of the lugs 26 are projected laterally from the body of the lower portion 24 and are each provided with a cam surface 30 adapted to engage a roller 31 which is mounted in a yoke 32 secured to the cross-frame. The arrangement of parts is such that, when the rack bar is elevated a sufficient distance, both of the lugs 26 will engage the roller 31 and further movement of such rack in an upward direction will cause the lower portion 24 of the follower-support to swing upon the rack bar as a pivot until the follower assumes the position shown in dotted lines in Fig. 2. In this position, the upper end of the filter casing is open for inspection, for the insertion of filter material and for purpose of cleansing. By rotating the hand wheel 17 in the appropriate direction, the rack bar will be lowered and the follower will gradually assume the position shown in full lines in Fig. 2. To secure and normally preserve the alinement of the upper and lower sections of the follower support, the lugs or prongs 26 are provided with a cross-bar 33 extending therebetween, and a screw 34 is threaded through said bar and adapted to bear at its inner end against the upper or rack-bar section 22. When the follower 21 is lowered from its tilted to its operative or normal position, the screw engages the upper section, and prevents the lower section from swinging out of alinement therewith.

Having thus described my invention, what I claim is:

1. The combination, with a casing, of a follower, a support therefor, such support comprising an upper and a lower section pivotally connected together, and means for causing one of said sections to swing at an angle with respect to the other.

2. The combination, with a casing, of a follower, a support therefor, such support comprising an upper and a lower section pivotally connected together, and means automatically operative by the raising of the support for causing one of said sections to swing at an angle with respect to the other.

3. The combination, with a casing, of a follower, a support therefor, said support comprising an upper and a lower section pivotally connected together, means for raising and lowering said support, and means adapted to engage the lower section of the support during the elevation of such support to cause the lower section to be deflected at an angle with respect to the upper section.

4. The combination, with a casing, of a follower, a support for said follower, said support comprising an upper and a lower portion pivotally connected together, means for raising and lowering said support, means for causing the lower portion to be deflected at an angle with respect to the upper portion, and means for preserving the alinement between said portions when in operative relation to each other.

5. The combination, with a casing, of a follower coöperating therewith, a frame above said follower, a support for the follower, a shaft mounted adjacent to the frame for raising and lowering the follower support, and means carried by the frame and adapted to engage said support when it has been elevated a predetermined distance to thereby tilt the support and the press carried thereby.

6. The combination, with a casing, of a follower coöperating with the said casing, a support for the follower, said support comprising an upper and a lower portion pivotally connected together, means adapted to engage the lower portion and tilt the same when said support has been elevated a predetermined distance, and adjustable means for limiting the movement of said lower portion in the reverse direction.

7. The combination, with a casing, of a follower coöperating therewith, a frame above said casing, a support for said follower, said support comprising an upper rack bar and a lower supporting member connected to the follower and pivoted to said rack bar, and a member carried by the frame and adapted to engage the lower supporting member and tilt the same and the follower at an angle to the rack bar.

8. The combination, with a casing, of a frame above said casing, a follower, a support for said follower, said support comprising a rack bar and a lower supporting member pivotally connected to said rack bar and having one or more lateral cam projections extending above its point of connection with the rack bar, a shaft mounted adjacent to said frame and having a pinion meshing with said rack bar, and a member projecting from the frame and adapted to engage the cam projection or projections on the lower supporting member.

9. The combination, with a casing, of a follower, a support for said follower, said support comprising an upper and a lower section pivotally connected together, the lower section having one or more cam projections, and a member in the path of movement of the said projection or projections adapted to engage the same.

10. The combination, with a casing, of a frame above said casing, a shaft mounted adjacent to said frame and having a pinion thereon, a follower, a support for said follower comprising an upper rack bar and a supporting member connected to the follower and pivotally connected to said rack bar, said member being provided with one or more cam projections, and a roller carried by the frame and in position to be engaged by the projection or projections on the supporting member.

11. The combination, with a casing, of a frame above said casing, a follower, a support for said follower comprising an upper and a lower member pivotally connected together, the lower member being provided with one or more cam-shaped projections extending laterally therefrom, a member carried by the frame and in position to be engaged by the projection or projections on the supporting member, and a screw carried by said projection or projections and adapted to engage the upper supporting member.

12. The combination, with a casing, of a frame above said casing, a shaft adjacent to said frame and provided with a pinion, a follower having a rack bar, a pinion on said shaft meshing with said rack bar, a gear on said shaft, a stub shaft, a hand wheel thereon, a pinion on said stub shaft meshing with the gear on the first-mentioned shaft, and a bearing for said stub shaft, said bearing having a recess merging therewith, a plunger in said recess adapted to engage said stub shaft, and means for operating said plunger.

13. The combination, with a casing, of a pair of standards projecting upwardly from said casing, a cross frame mounted on said standards and having at one end thereof a downwardly projecting sleeve provided with a lateral extension, a shaft supported by the cross frame and having a pinion at the central portion of said frame, a follower, a rack bar for raising and lowering the same, a pinion on said shaft meshing with said rack bar and a gear on the outer end of said shaft, a shaft mounted in said extension and having a pinion thereon meshing with said gear, a hand wheel for operating the last-mentioned shaft, and means mounted in said extension adapted to engage said stub shaft.

14. The combination, with a casing, of a frame above said casing having at one end thereof an outwardly projecting sleeve provided with a lateral extension, a shaft supported by the frame and having a pinon at the central portion of said frame, a follower, a rack-bar for raising and lowering the same, a pinion on said shaft meshing with said rack-bar and a gear on the outer end of said shaft, a shaft mounted in said extension and having a pinion thereon meshing with said gear, means for operating the last-mentioned shaft, and means for temporarily preventing the rotation of the last-mentioned shaft, said means comprising a recess in said extension merging with the bearing therein, a plunger in said recess having a beveled face adapted to engage said shaft, and a bolt threaded into said extension and carrying said plunger.

15. The combination, with a casing, of a follower, means for raising and lowering said follower, and means adapted to engage and tilt said follower during the raising movement of the same.

16. The combination, with a casing, of a follower, means for raising and lowering said follower, said means comprising a shaft operatively connected with said follower and provided with a gear, a second shaft having a gear meshing with the gear on the first-mentioned shaft, a bearing upon the second shaft having a recess merging therewith, a reciprocable plunger in said recess, and means for moving the same into and out of engagement with the last-mentioned shaft.

In testimony whereof, I hereunto affix my signature in the presence of two witnesses.

HENRY G. MILLER.

Witnesses:
J. B. HULL,
A. J. HUDSON.